(12) United States Patent
Ernst et al.

(10) Patent No.: US 6,490,746 B1
(45) Date of Patent: *Dec. 10, 2002

(54) APPARATUS AND METHOD FOR CLEANING OBJECTS HAVING GENERALLY IRREGULAR, UNDULATING SURFACE FEATURES

(75) Inventors: Gerard W. Ernst, Rochester, NY (US); Thomas Albano, Churchville, NY (US); Dean L. Smith, Pittsford, NY (US); Klaus R. Pohl, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 09/624,878

(22) Filed: Jul. 24, 2000

(51) Int. Cl.[7] .............................. A47L 13/40; A47L 5/14
(52) U.S. Cl. ........................ 15/1.51; 15/309.2; 15/345
(58) Field of Search ................... 15/1.51, 303, 306.1, 15/309.1, 309.2, 345; 361/213, 220, 222; 134/21, 34, 37

(56) References Cited

U.S. PATENT DOCUMENTS

| 3,395,042 A | * | 7/1968 | Herbert |
| 4,003,226 A | | 1/1977 | Holdsworth |
| 4,198,061 A | | 4/1980 | Dunn |
| 4,594,748 A | | 6/1986 | Warfvinge |
| 4,835,808 A | * | 6/1989 | Hahne et al. |
| 5,265,298 A | * | 11/1993 | Young |
| 5,421,901 A | * | 6/1995 | Whitney et al. |
| 5,457,847 A | * | 10/1995 | Uzawa et al. |
| 5,491,602 A | | 2/1996 | Horn et al. |
| 5,991,965 A | * | 11/1999 | Stroh et al. |
| 6,205,676 B1 | * | 3/2001 | Fujii et al. |

* cited by examiner

*Primary Examiner*—Terrence R. Till
(74) *Attorney, Agent, or Firm*—Clyde E. Bailey, Sr.

(57) ABSTRACT

An apparatus and method for cleaning objects having generally irregular, undulating surface features, such as reloadable photographic cameras, has a partial enclosure having opposing side walls, and a top wall joining the opposing side walls. A pair of air ionizing members are arranged on the interior of the opposing side walls and a source of a curtain-like stream of air is arranged in the top wall.

20 Claims, 8 Drawing Sheets

APPARATUS AND METHOD FOR CLEANING OBJECTS HAVING GENERALLY IRREGULAR, UNDULATING SURFACE FEATURES

CROSS-REFERENCE TO RELATED APPLICATIONS

The present application is related to U.S. application Ser. No. 09/624,628, filed Jul. 24, 2000, by Thomas Albano, et al., and entitled, "Apparatus For Neutralizing Electrostatic Charges On Generally Irregular, Undulating Surfaces;" and U.S. application Ser. No. 09/624,627, filed Jul. 24, 2000, by Gerard W. Ernst, et al., and entitled, "Apparatus And Method For Cleaning Objects Having Generally Irregular Surface Features."

FIELD OF THE INVENTION

The invention relates generally to an apparatus and method for cleaning particles adhered to an object. More specifically, the invention concerns an apparatus and method for cleaning particles, e.g., dust, from generally irregular, undulating, surface features of objects or recyclable product so that the product can be refurbished and returned to the stream of commerce.

BACKGROUND OF THE INVENTION

Apparatus for cleaning charged particles, such as dust, from surfaces of objects are well known in the art. Existing cleaners are most effective for cleaning particles from substantially flat surfaces, such as web. Referring to FIG. 1, objects 1 having generally irregular or undulating surface features 2, e.g., non-planar surfaces, present a special challenge to clean because such surfaces have a plurality of features 2 that makes it difficult to dislodge particles using existing techniques.

In the process of manufacturing articles comprising polymeric materials, such as camera components, electrostatic charges inevitably are produced on the surface of the components. It is well known that these charges become sites for attracting oppositely charged ambient particles, such as dirt and other contaminants that can effect product quality if not cleaned prior to assembly.

Similarly, recyclable cameras, which are returned to the manufacturer for refurbishing, accumulate dirt and other undesirable particles that must eventually be cleaned during refurbishing. When the camera shells are opened at photofinishers for processing, ambient particles, in the form generally of dirt, can accumulate inside the cameras. Further, camera storage and the recycling process can expose the re-useable components of the camera to fibers and particles large enough to enter the film exposure window resulting in shadow images of these particles and fibers on the customer's pictures. Therefore, refurbishable camera components must undergo some level of cleaning to prevent such particles from accumulating on functionally sensitive features of the camera that could adversely effect product quality and performance.

Present systems for cleaning objects having generally irregular, undulating, surface features, such as recyclable cameras components, prior to refurbishing, use air nozzles with ionizing emitters to attempt to neutralize the static charge from the camera components and blow the particles off the discharged surfaces. In these systems, an overhead duct with a fan and filter removes the dislodged particles from the cleaning system. A significant shortcoming of these existing cleaning systems is that they are much too inefficient to operate. Such cleaning systems require a large volume of air to prevent dust recontaminating the cameras during cleaning because the particles removal duct is arranged overhead. This typically results in large volumes of dust-laden air being drawn from the surrounding room air into the cleaning device. Moreover, given the directional nature of the air nozzles, air is directed not only upwardly, but also inwardly from the entrance of the cleaning enclosure to the manufacturing environment due to a negative pressure region. Further, air propagates along the direction of the air nozzles, down the production line conveyor bearing the object to be cleaned. As a result, there is a high risk of re-contaminating the cameras after cleaning. Further, we have observed with existing cleaning processes, that dust would generally settle on the overhead filter and then migrate in large clumps downwardly towards and onto the cameras being cleaned.

Another existing apparatus for cleaning objects having generally irregular, undulating surface features, such as photographic camera parts, uses a pair of low volume air nozzles with ionizing emitter elements, followed by exhausting the air with a high volume air transvector exhaust device. The transvector exhaust device uses a small amount of compressed air to generate a larger volume of air. The low volume ionizing air nozzles were angled down the product conveyor towards the exhaust device, and both were mounted in a tunnel-like configuration. This design was also unsatisfactory, as the air nozzles did not provide enough force to dislodge particles and neutralize the electrostatic bonding force between the particles and the electric field intensities on the camera. This was the case even though the electrostatic charge was sufficiently reduced on the surface of the camera. More damaging, the transvector was drawing a large volume of room air into the chamber, and because of the directionality of the air from the nozzles to the transvector, large volumes of dirty air was being discharged down the conveyor belt.

Those skilled in the relevant art will appreciate that air nozzle or curtain cleaning devices are well known in the field. They are, however, exclusively used for cleaning substantially flat surfaces of articles, such as fabrics, film rolls and sheets, and other such web materials, as well as recording disks. This is because the air must be forced onto the surface of the object to be cleaned at an angle in order to provide enough force to dislodge the particle. In addition, for certain cleaning applications, a vacuum system must be employed to remove the particles from the cleaning enclosure so as to prevent re-contamination of the object being cleaned. Objects having irregular surface features, i.e., three dimensional or surfaces having protuberances such as camera components, do not allow intimate enough location for effective cleaning, and present too many angles to an air knife to be effective.

U.S. Pat. No. 4,594,748, by Warfvinge, Jun. 17, 1986; U.S. Pat. No. 5,491,602,; by Horn et al., Feb. 13, 1996; U.S. Pat. No. 4,003,226, by Holdsworth, Jan. 18, 1977; and U.S. Pat. No. 4,198,061, by Dunn, Apr. 15, 1980; each discloses an apparatus for removing dust from generally flat surfaces, such as film rolls, fabric rolls, records, belts and other basically two-dimensionally surfaces. A major shortcoming of each of these cleaning devices is that they have proven woefully inadequate for cleaning objects, like camera components, having irregular features (non-planar) and surfaces.

Therefore, a need persists in the art for an apparatus and method for cleaning particles from objects having generally irregular, undulating, surface features that reduces the chances of object recontamination, will not impede assembly or packaging process speeds, and provides a localized clean environment to prevent further recontamination.

SUMMARY OF THE INVENTION

It is, therefore, an object of the invention to provide an apparatus for cleaning particles from objects having generally irregular, undulating, surface features.

Another object of the invention is to provide an apparatus for cleaning objects having generally irregular, undulating, surface features without directly contacting the object.

It is another object of the invention to provide an apparatus that removes contaminant particles from product having generally irregular, undulating, surface features so as to enable the product to be refurbished and returned to the stream of commerce.

Yet another object of the invention is to provide an apparatus and method for disposing of particles dislodged from the generally irregular, undulating surface features of product being cleaned so as to prevent cross-contamination of other product.

Important features of the apparatus for cleaning objects having generally irregular, undulating, surface features include a partial enclosure within which to clean the objects. A pair of opposing ionizing members is arranged in the partial enclosure for cooperatively neutralizing electric field intensities associated with adhered particles. Cooperating with the ionizing members are means for dislodging and disposing of particles electrostatically adhered to the generally irregular, undulating surface features of the objects.

To achieve the aforementioned objects of the invention, there is provided, in one aspect of the invention, an apparatus for cleaning objects having a generally irregular, undulating, surface features, said apparatus comprising: a partial enclosure having opposing side walls, a top wall joining said opposing side walls, a first opening at one end of said opposing side walls and a second opening opposite said first opening; an object support member for supporting objects being cleaned with the generally irregular, undulating surface features exposed for cleaning inside said partial enclosure; a first air ionizing element arranged in said partial enclosure at a predetermined angle relative to said generally irregular, undulating surface features, said first air ionizing element directing a curtain-like stream of ionized air onto the generally irregular, undulating surface features of said objects being cleaned thereby neutralizing electric field intensities and dislodging charged particles from one portion of said generally irregular, undulating surface features; a second air ionizing element arranged in said partial enclosure opposite said first air ionizing element, said second air ionizing element being arranged at a predetermined angle relative to said generally irregular, undulating surface features, said second air ionizing element directing a curtain-like stream of ionized air onto the generally irregular, undulating surface features of said objects being cleaned thereby neutralizing electric field intensities and dislodging charged particles from a remaining portion of said generally irregular, undulating surface features; and, means for exhausting particles dislodged from said generally irregular, undulating, surface features, said particles being captured by a downward flow of directed air and directed away from said objects being cleaned.

In another aspect of the invention, an apparatus for cleaning objects having generally irregular, undulating surface features, said apparatus comprising: a partial enclosure having opposing side walls, a top wall joining said opposing side walls, a first opening at one end of said side walls and a second opening opposite said first opening; an object support member for supporting said objects with said generally irregular, undulating surface features exposed for cleaning in said partial enclosure; an air ionizing element arranged in said partial enclosure symmetrically about said generally irregular, undulating surface features, said air ionizing element directing a curtain-like stream of ionized air onto said generally irregular, undulating surface features of said objects thereby neutralizing electric field intensities and dislodging particles from said generally irregular, undulating surface features; and, means for exhausting particles dislodged from said generally irregular, undulating surface features, said particles being captured in a downward flow of directed air and directed away from said objects.

In yet another aspect of the invention, a method of cleaning objects have generally irregular, undulating surface features, comprises the steps of: providing a cleaning apparatus comprising a partially enclosed enclosure; a source of filtered directed air; and a pair of ionizing members positioned on opposite walls of said partially enclosed enclosure; providing an object support member for supporting said objects for cleaning in said cleaning apparatus; arranging said objects on said object support member with said generally irregular, undulating surface features exposed for cleaning; positioning said objects on said object support member for exposure inside said at least partially enclosed enclosure; directing a curtain-like stream of air across said generally irregular, undulating surface features of said objects; ionizing said generally irregular, undulating surface features of said objects for a predetermined period of time, said step of ionizing comprising neutralizing static charges on a first portion of said generally irregular, undulating surface features and neutralizing static charges on a remaining portion of said generally irregular, undulating surface features so as to dislodge particles electrostatically attracted to said first portion and said remaining portion, respectively, of said generally irregular, undulating, surface features; continually exhausting said partially enclosed enclosure so as to eliminate particles dislodged from said generally irregular, undulating surface features; and, removing said objects from said at least partially enclosed enclosure.

The above invention has numerous advantages over existing developments, including: it overcomes the limitations of conventional ionization and air knife cleaners to remove electrostatically bonded dust from generally, irregular, undulating surface features; it operates automatically without direct operator intervention; it is cost effective to construct and operate; and, it is simple to use.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
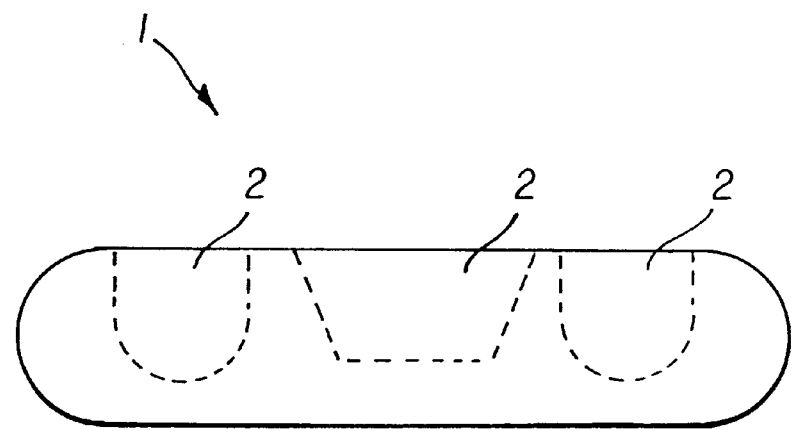
FIG. 1 is a side view of a typical object having irregular shaped features cleaned by the apparatus of the invention.
Figure 2:
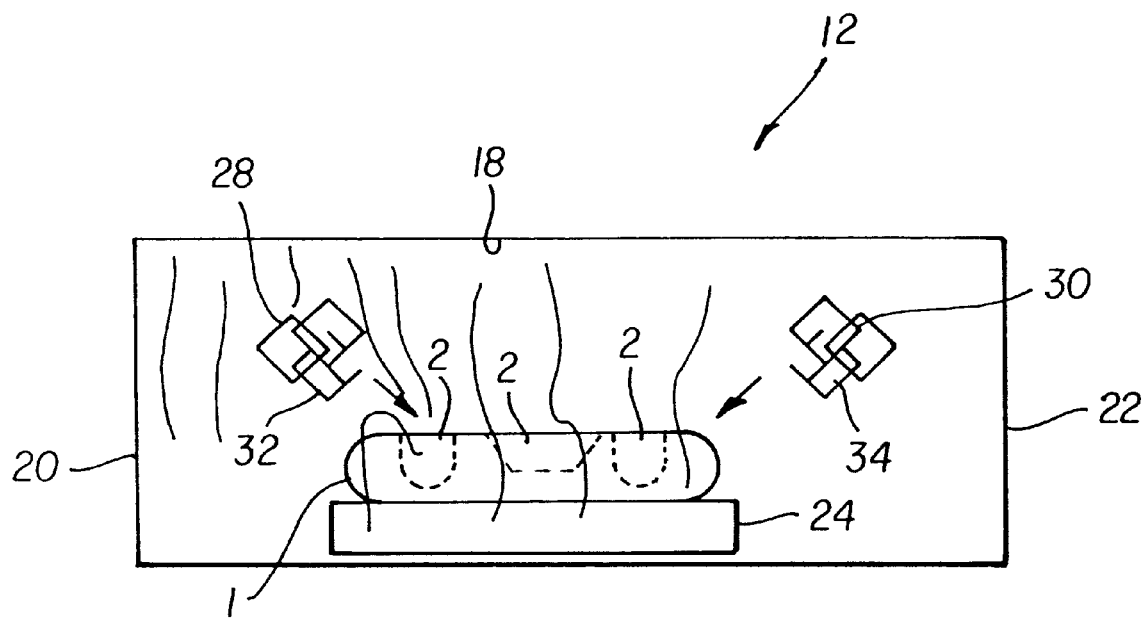
FIG. 2 is an elevated side view, partially torn away to show the object being cleaned, in the cleaning apparatus of the invention.
Figure 3:
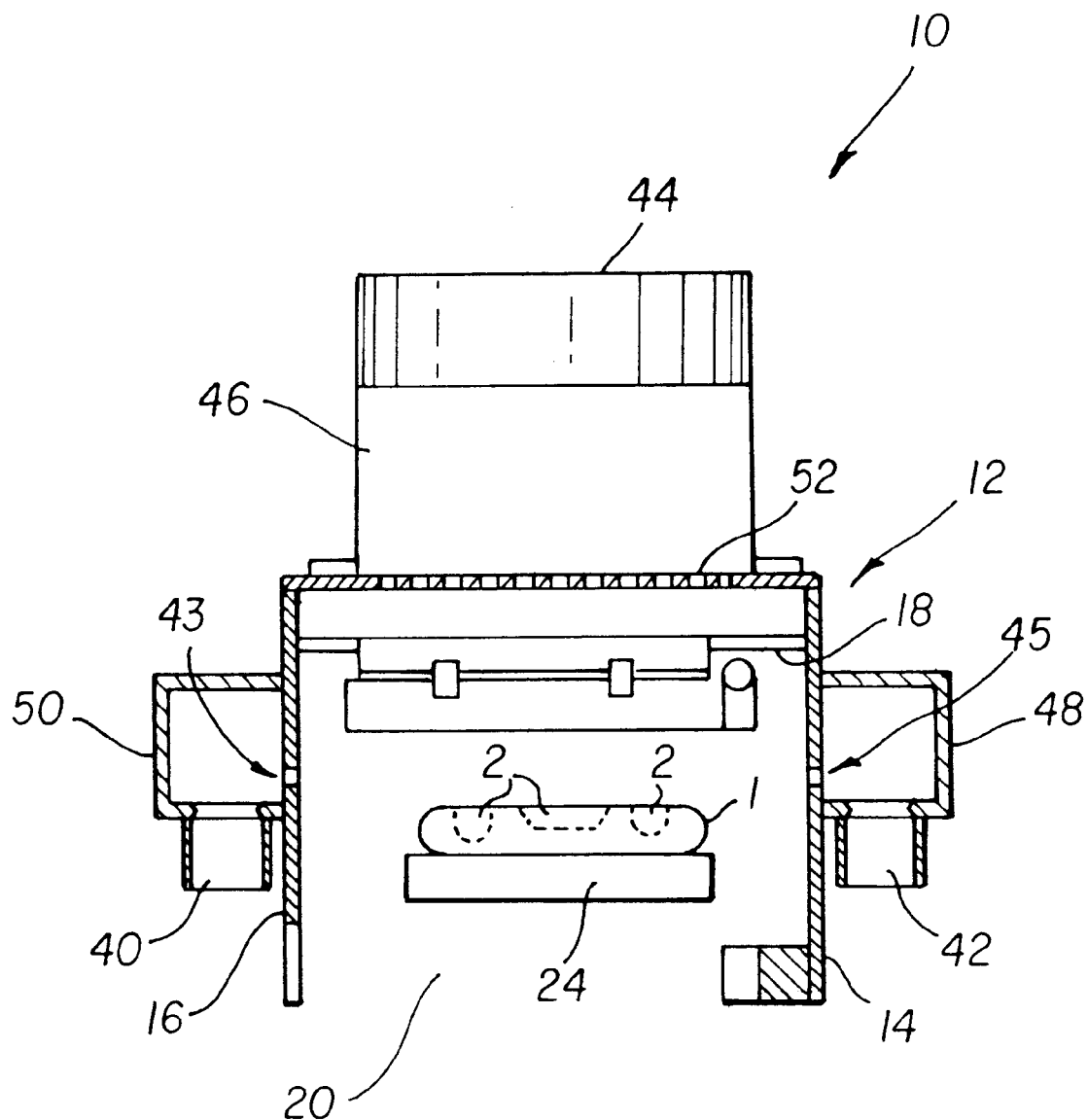
FIG. 3 is a partially sectioned end view of the apparatus of the invention.

Turning now to the drawings, and more particularly to FIGS. 2–3, the apparatus 10 for cleaning objects 1 having generally irregular, undulating surface features 2 is illustrated. Objects 1 (depicted in FIG. 1) to be cleaned, such as camera components, have generally three-dimensional features 2 that are exceedingly difficult to totally clean of typically electrostatically attracted contaminant particles using existing cleaning techniques which are intended for cleaning generally flat surfaces. Skilled artisans will appreciate that other types of contaminant adhering modes may also exist, such as particle sticking. Apparatus 10, moreover, has proven efficient at removing such particles from generally irregular, undulating surface features 2 of objects 1. Thus, apparatus 10 of the invention advantageously overcomes these and other shortcomings of present developments.

Figure 4:
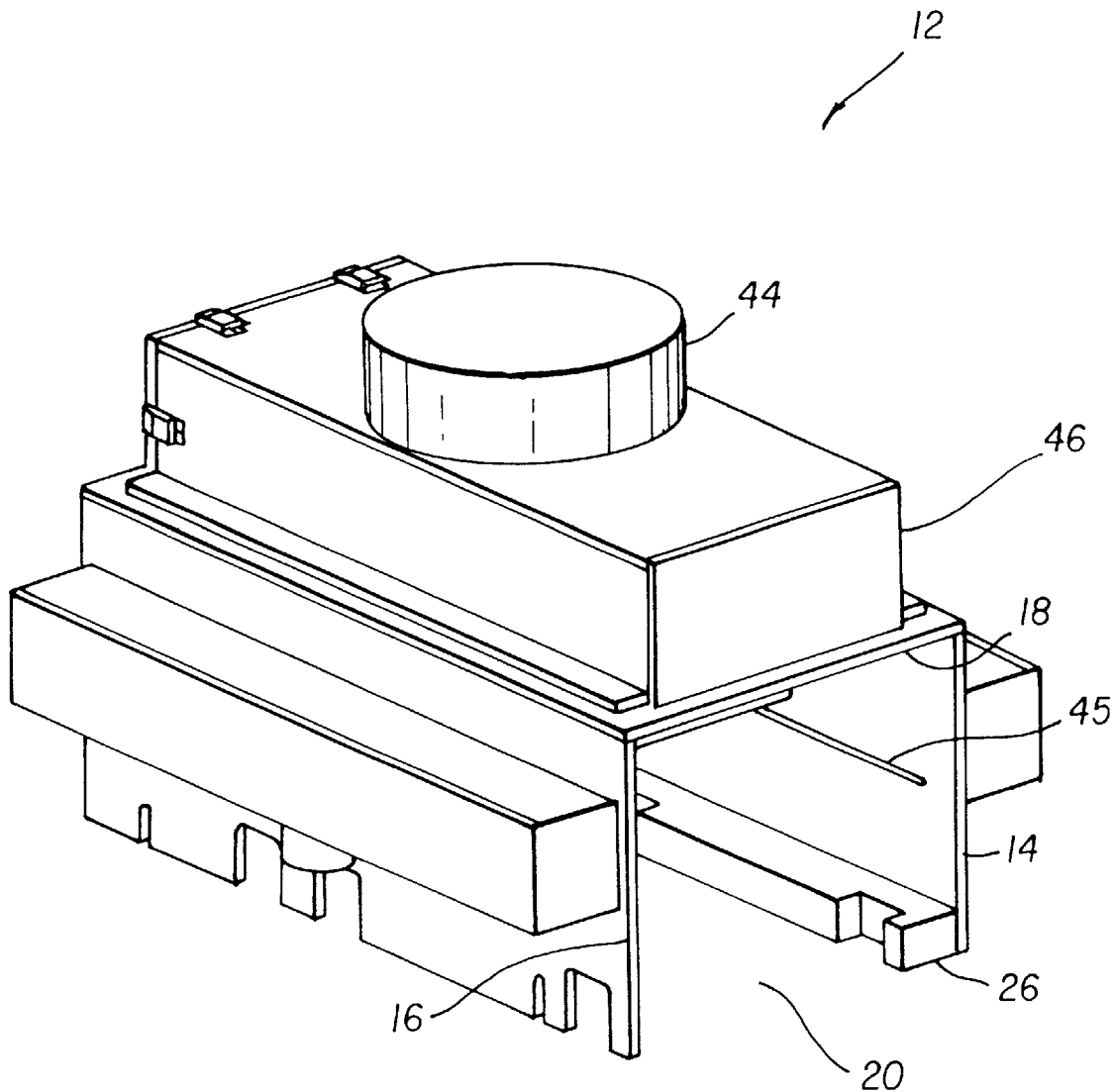
FIG. 4 is a perspective view of the partial enclosure of the invention.

Referring to FIGS. 3 and 4, apparatus 10, broadly defined, includes a partial enclosure 12 in which the objects 1 are cleaned. According to FIG. 4, enclosure 12 has opposing side walls 14, 16 and a top wall 18 joining the opposing side walls 14, 16. A first opening 20 is arranged at one end of the side walls 14, 16 for moving the objects 1 into the partial enclosure 12. Opposite the first opening 20, a second opening 22 (not clearly shown) is arranged for moving the objects 1 from the partial enclosure 12 downstream for further independent processing once cleaning is complete.

Referring again to FIGS. 2 and 3, an object support member 24 is provided to support the objects 1 with the generally irregular, undulating surface features 2 exposed for cleaning in the partial enclosure 12. Object support member 24 preferably has a generally flat surface for supporting a plurality of objects 1 being cleaned with the irregular surface features 2 exposed for cleaning. Those skilled in the art will appreciate that generally flat surface for supporting objects 1 may be either fixed relative to the enclosure 12 or movable between the first opening 20 and second opening 22 of the enclosure 12. In this latter case, a continuously movable support member 24, such as a conveyor, for sequentially transporting a continuous stream of objects 1 for cleaning between the first opening 20 and second opening 22 of the partial enclosure 12 may be used. As shown in FIG. 4, enclosure 12 may mount onto or over object support member 24 by, for instance, a base block 26 or similar mounting member affixed to either side wall 14, 16. Thus, enclosure 12 may cooperate with a stationary platform or a plurality of conveyance transport mechanisms, e.g., a conveyor belt (not shown).

Referring now to FIGS. 2 and 5–7, important to the invention are first and second ionizing elements 28, 30. First and second ionizing elements 28, 30 are arranged between opposing side walls 14, 16 in the partial enclosure 12 for ionizing electric field intensities on the generally irregular surface features 2. We have found it preferable to position first air ionizing element 28 proximate to the first opening 20 of the enclosure 12 and to position second air ionizing element 30 proximate to the second opening 22. In this way, the ionization effects are maximized during the cleaning process.

Figure 2A:
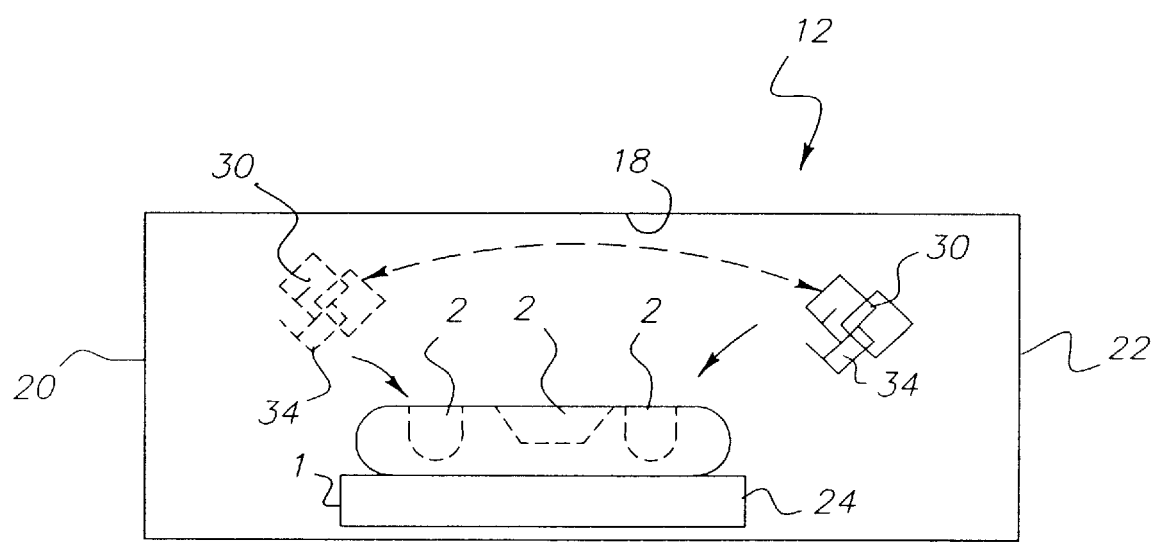
FIG. 2A is the apparatus of the invention with a single movable air ionizer element.

According to FIG. 2A, in an alternative embodiment, apparatus 10 may have a single air ionizing element 30 movable about the object being cleaned from a first position proximate to the first opening 20 to a second position proximate to the second opening 22. This achieves the same resit as first and second air ionizing elements 28, 30 previously discussed and shown in FIG. 2.

Figure 5:
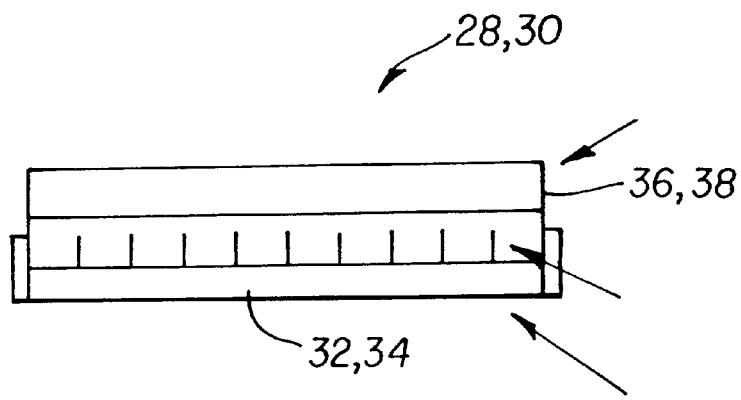
FIG. 5 is a front view of an ionizing element of the invention.
Figure 6:
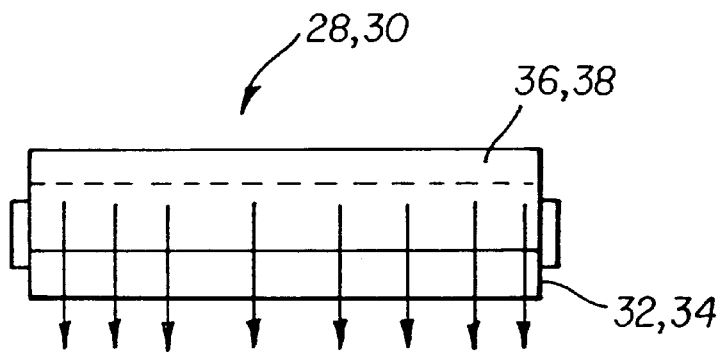
FIG. 6 is a top view of an ionizing element of the invention.
Figure 7:
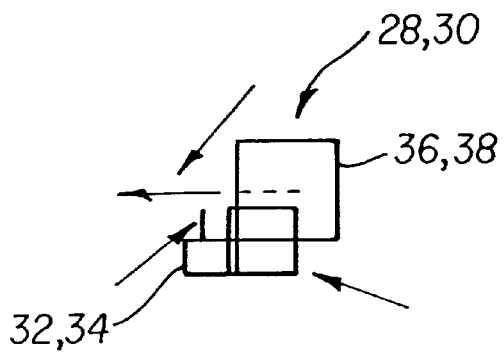
FIG. 7 is an elevated end view of an ionizing element of the invention.

According to FIGS. 5–7, in the preferred embodiment, first and second ionizing elements 28, 30 (only one shown) each comprises a first and second ion emitter 32, 34, respectively. First and second ion emitter 32, 34, such as model MEB manufactured by Simco of Hatfield, Pa., generates a cloud of charged ions that electrostatically neutralizes the irregular surface features of objects being cleaned. Cooperating with each the first and second ion emitters 32, 34 is means for introducing a curtain-like stream of air. In our preferred embodiment, first and second air knives 36, 38 are the preferred means for introducing the curtain-like stream of air. Each one of the first and second air knives 36, 38 is arranged so that the ion cloud produced by either of the first and second ion emitter 32, 34, respectively, is entrained in the curtain-like stream of air. This relationship allows the curtain-like stream of air to transport the cloud of ions onto the targeted irregular surface features 2 of the object 1 thereby neutralizing any electrostatically attracted particles thereon. Although there are a variety of air knife products that may be used, we prefer using the static neutralizing curtain transvector manufactured by Simco. Each of the devices functions in generally the same manner to produce a stream of air for transporting the cloud of ions toward the target object with sufficient force to lift and remove particles from a surface.

Figure 10:
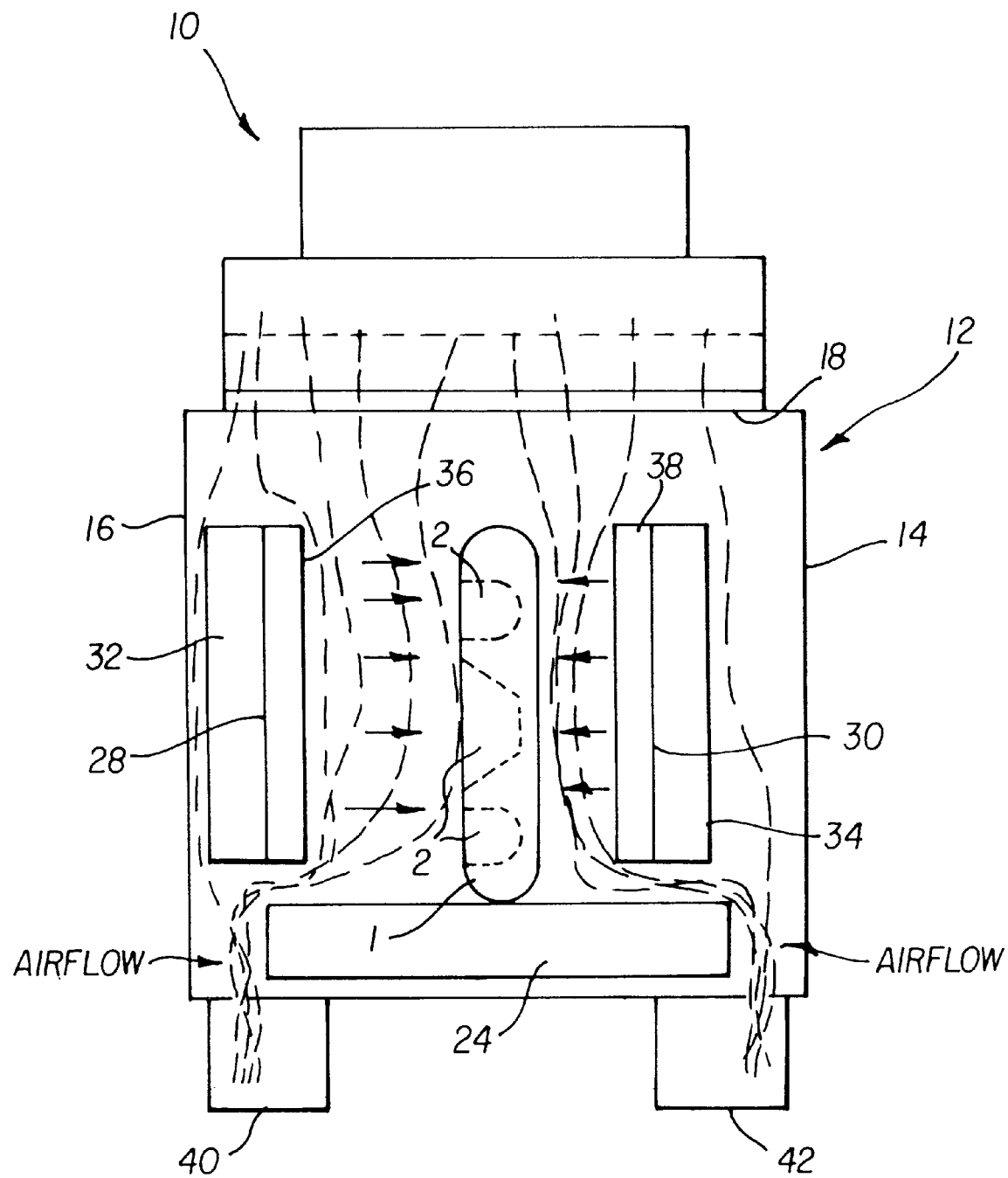
FIG. 10 is an alternative arrangement of the air ionizing elements in the enclosure of the invention.

Referring to FIGS. 3, and 5–7, more particularly, first ionizing element 28, comprising first ion emitter 32 proximate to and upstream of first air knife 36, is arranged between opposing side walls 14, 16 at a first predetermined angle slightly above the object 1 being cleaned. The predetermined angle is chosen such that the ionization effects on the object 1 being cleaned are maximized. Alternatively, ionizing elements 28, 30 may be arranged along opposing side walls 14, 16 as shown in FIG. 10. In either case, the cloud of ions produced by the first ion emitter 32 is entrained by the curtain-like stream of air and then transported onto a portion of the irregular surface features 2 of the object 1. Second air ionizing element 30, comprising second ion emitter 34 proximate to and upstream of second air knife 38, is arranged between opposing side walls 14, 16. Similarly, second air knife 38 introduces a second curtain-like stream of air that entrains the second cloud of ions and transports onto a remaining portion of the irregular surface features 2 of the object 1 being cleaned.

With the application of first and second ion emitters 32, 34 and cooperating first and second air knives 36, 38, respectively, the irregular surface features 2 of the object 1 being cleaned and any charged particles, such as dust thereon, are electrostatically neutralized to near zero potential. The ions directed to the generally irregular, undulating surface features 2 combine with any electric field intensities associated with the object 1 and dust, causing these electric field intensities to be neutralized in the process. It is well known electric field intensities on parts and materials cause a significant attraction of ambient and polarized dust particles and the like. The curtain-like sheet of air provided by the air knives 36, 38 produces and directs a high velocity force of air to a localized area under the dust particles. This force is sufficient to cause the dust particles to momentarily elevate allowing ionized air to neutralize the electrostatic bonding force at the interface of the particle and irregular surface features 2 of the object 1 being cleaned.

Figure 8:
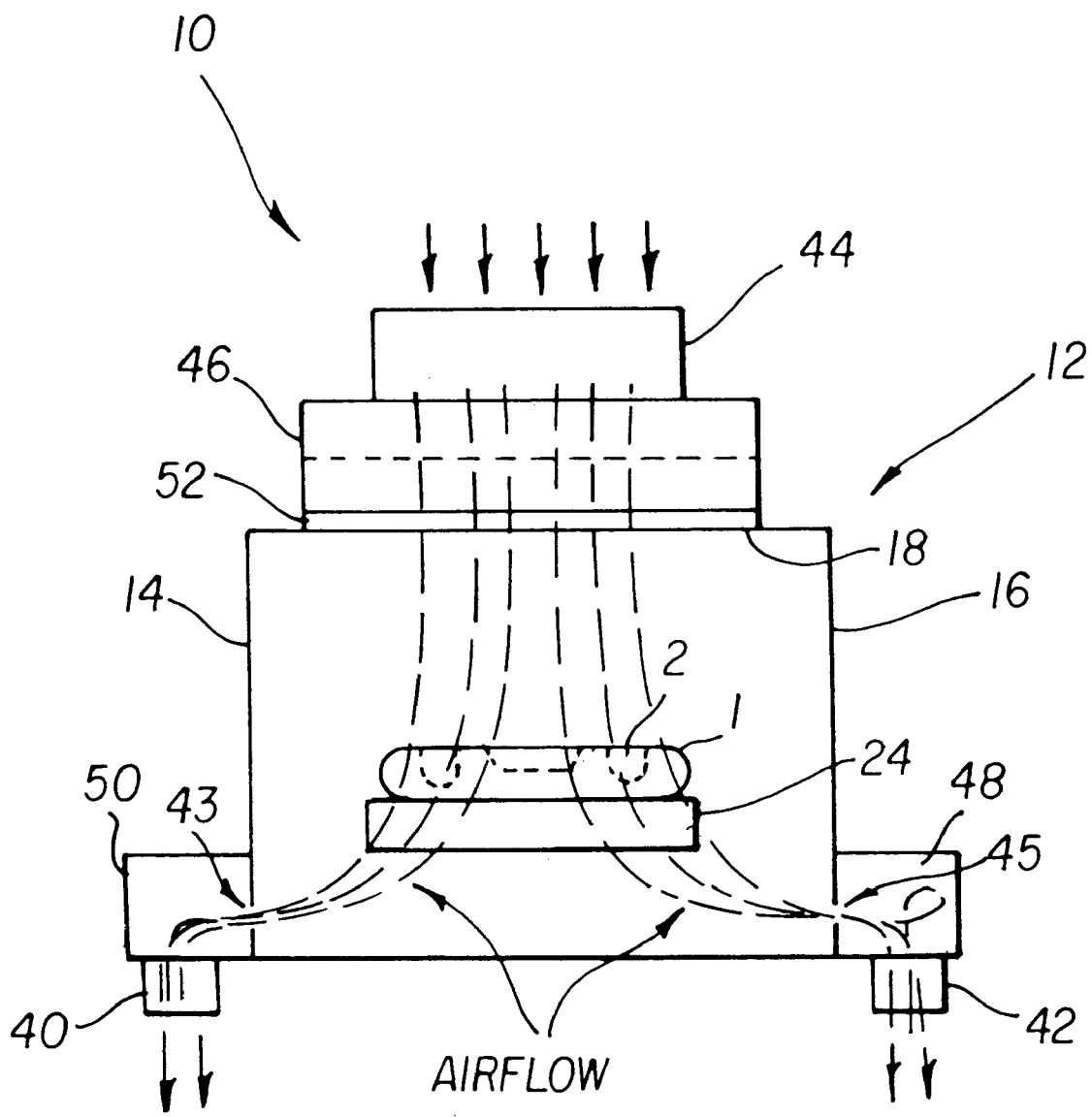
FIG. 8 is an end view of the cleaning enclosure showing effects of air pressurization.

Referring to FIGS. 3–4 and 8, 9A, and 9B, once the contaminant particles are dislodged from the electrostatically neutralized surface of the object, they are swept in the direction (denoted by the arrows in FIGS. 8 and 9) of the ionizing airflow, suspended, and then evacuated away from the object 1 to be cleaned. Referring to FIG. 8, particles dislodged from the surface of the object 1 are momentarily suspended in the enclosure 12 and then evacuated via the negative pressure exhaust slots 43, 45 in opposing side walls 14, 16. The particles become entrained in the airflow provided by the blower 54 and filter assembly 46.

Referring again to FIGS. 8, 9A, and 9B, particles dislodged from the objects 1 are exhausted from the partial enclosure 12 so that they do not re-contaminate any of the objects 1 to be cleaned. According to FIGS. 8 and 9A, a clean air flow is introduced into the partial enclosure 12 consisting of a stream of filtered air. This filtered, clean air is introduced through a perforated metal baffle 52 in top wall 18 and, importantly, provides a positive pressurized mini environment in which the objects 1 are cleaned, to prevent dirty air from surrounding areas into the partial enclosure 12. Moreover, in our preferred embodiment, the dust particles removed from the object 1, are drawn through exhaust slots 43, 45 located near the bottom of the partial enclosure 12 and along the side walls 14, 16 of the partial enclosure 12, parallel to the object support member 24, such as a conveyor belt. Because the overall airflow is downward, gravity assists the removal of the dust away from the object 1. The exhaust slots 43, 45 are designed to cause the exhausted air to travel at a high velocity into the exhaust chambers 48, 50 mounted on either side wall 14, 16 of the enclosure 12. According to FIGS. 8 and 9A, generally, the exhausted air is drawn through exhaust chambers 48, 50 through tubing (not shown) attached to the exhaust ports 40, 42, then to exhaust filter 47 and blower 54. Exhaust slots 43, 45 are positioned generally beneath and to the sides of the enclosure 12 so that a negative pressure zone located at the area of the exhaust slots 43, 45 draw away the neutralized and dislodged particles with added gravity assist. The exhaust slots 43, 45 are evacuated by a blower 54, with exhaust filter 47 to trap exhausted particles. The volume of air exhausted must be less than the volume provided by the filtered air source and the air knives 36, 38, in order to maintain a positive pressurization to the surrounding area, but closely matched to prevent exhausting particles into the surrounding area.

The overall volume of the air flowing through the partial enclosure 12 must be low enough to preclude ion recombination and allow the ionizing air knives 36, 38 to work effectively. According to FIGS. 8, 9A, and 9B, the overall flow of air is to be downward, to use gravity to assist in particle removal, and preferably in a direction ninety degrees from the first opening 20 and second opening 22 of the partial enclosure 12, to prevent the transvector effect.

Figure 9A:
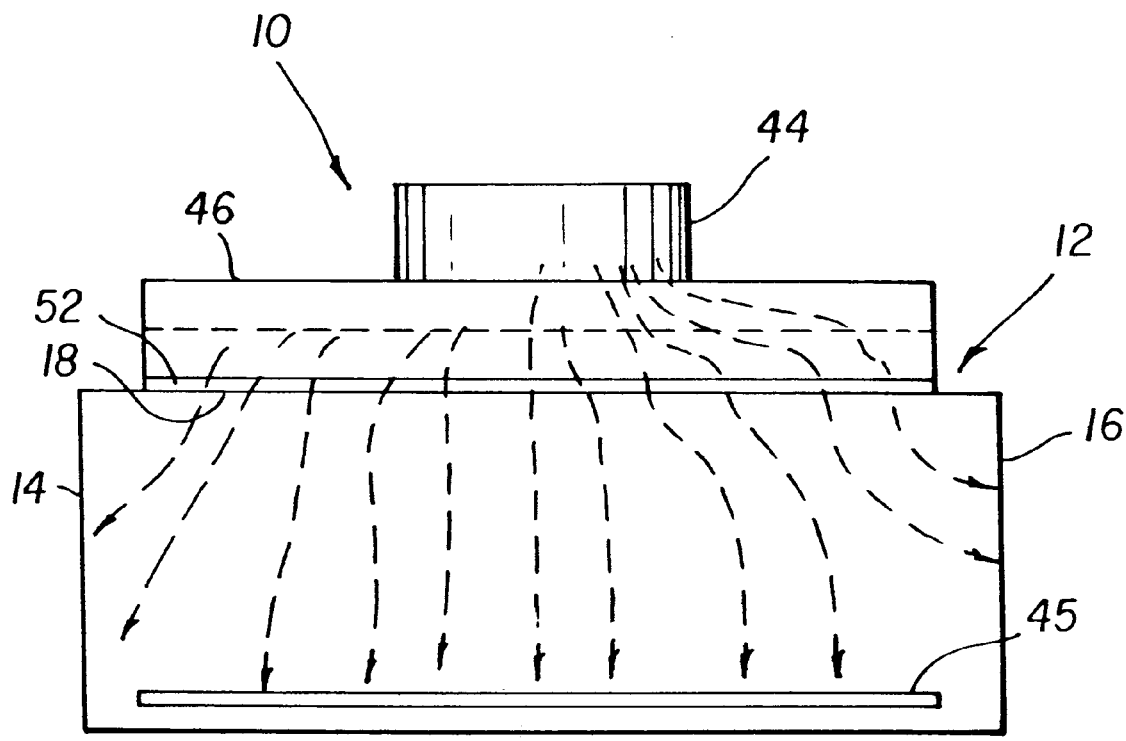
FIG. 9A is a side view of the cleaning enclosure of FIG. 8.
Figure 9B:
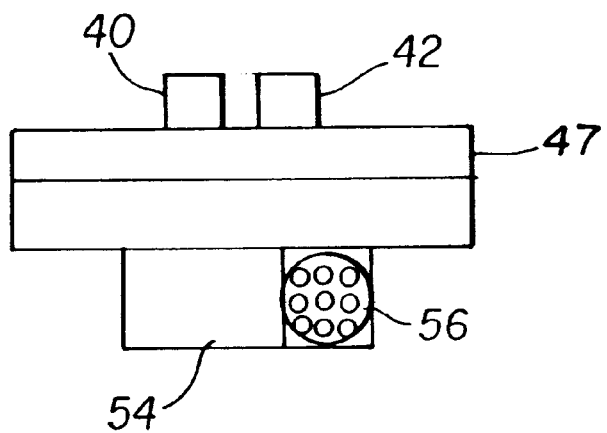
FIG. 9B is a section view of the exhaust and filter assembly of FIG. 9A.

According to FIGS. 8, 9A, and 9B, the dirty air is first drawn through filter assembly 46 to remove the dust from the airflow. The air has been pulled through the exhaust slots 43, 45 by a blower 54, which returns the air to the room through a perforated metal baffle 56 which regulates the volume exhausted.

Referring to again to FIGS. 8, 9A, and 9B, the combination of the clean supply air and the exhausted air is balanced by the selection of fan 44 and blower 54, and by the use of the perforated metal baffles 52, 56 in such a way that the pressure inside the partial enclosure 12 is greater than the surrounding room. Baffle 52 is used to restrict the air flow from the fan 44 to provide even distribution of air flow. Baffle 56 is used to somewhat restrict the exhaust air flow in order to provide the air balance. This prevents any dust in the room air from being deposited onto the object being cleaned while it is in the partial enclosure 12. The overall volume of air is further controlled in such a way as to not interfere with the efficient operation of the ionizing air knives 36, 38. Because the static charge has been eliminated from the generally irregular, undulating surface features 2 of the object 1, it is significantly less likely to attract dust from the surrounding room air before the next operation is performed.

The invention can be further appreciated by reference to the following specific examples:

EXAMPLE 1

This example demonstrates that for the apparatus 10 of the invention, an air knife pressure of at least 20 psi yields extraordinary cleaning of both fibers and plastic contaminants from the object being cleaned.

Apparatus 10 (refer to FIGS. 2 and 3) of the invention for cleaning irregularly shaped features 2 of objects 1 was tested for electric field intensity and particle removal efficiency. A rough measure of the electric field intensity was made using an electrostatic fieldmeter, such as a Simco Hand-E-Stat™ meter. The test sequence consisted of first tribo charging the object 1 being cleaned, such as a camera body component, with a color (e.g., blue) cotton cloth, to approximately −2000 volts/cm. A piece of polystyrene is then scraped over the camera component, adding plastic shavings or skivings onto the generally irregular, undulating surface features 2, including, for instance, in the film wells and lens baffle. Using the electrostatic fieldmeter, the electric field intensity is measured from the exposed surface of the object in order to confirm the level of electric field intensity. After confirming the electric field intensity, the object or camera part is placed on an object support member 24, preferably a conveyor line, and passed through the enclosure 12 for cleaning.

Upon exiting the enclosure 12, the electric field intensity of the object 1 is again measured using the electrostatic fieldmeter and compared with the initial charge level. Evaluation of the cleanliness of the object also included making separate visual observations for the fibers and the plastic shavings or skivings initially placed on the object 1 prior to cleaning.

The following rating system was devised for evaluation purposes: a rating of 1 was assigned if there was no visible difference before and after testing; a 2 rating was assigned where visible change had occurred, but that it was slight; a 3 rating was assigned when there was some debris left large enough to cause a defect, but the part was still significantly cleaner than before; a 4 rating was assigned where the object was free of particles and fibers 2 millimeters or larger, the limit after which a level 3 defect could result; and, a rating of 5 was assigned where no particles or fibers even close to large enough to cause a dirt defect.

Using the above regiment for testing the efficacy of apparatus 10 of the invention, the results of the initial object cleaning test are summarized in Table I.

TABLE I

| airknife psi | E-field before kv/cm. | E-field after kv/cm. | fiber remov | plastic removal |
|---|---|---|---|---|
| 6 | 2.1 | 0.08 | 1 | 1 |
| 6 | 2.22 | 0.04 | 1 | 1 |
| 6 | 2.98 | 0.02 | 1 | 1 |
| 10 | 2.47 | 0.07 | 2 | 1 |
| 10 | 2.17 | 0.07 | 3 | 2 |
| 10 | 2.47 | 0.11 | 2 | 2 |
| 15 | 3.07 | 0.1 | 4 | 4 |
| 15 | 2.35 | 0.11 | 3 | 2 |
| 15 | 2.48 | 0.16 | 4 | 3 |
| 20 | 2.54 | 0.14 | 5 | 4 |
| 20 | 3.5 | 0.11 | 5 | 4 |
| 20 | 2.04 | 0.09 | 5 | 3 |
| 24 | 2.6 | 0.15 | 5 | 3 |
| 24 | 2.78 | 0.15 | 4 | 4 |
| 24 | 2.79 | 0.07 | 5 | 5 |
| 28 | 1.56 | 0.05 | 5 | 5 |
| 28 | 1.76 | 0.07 | 5 | 5 |
| 28 | 2.17 | 0.09 | 5 | 4 |

The results indicate that an air knife pressure of at least 20 psi, preferably 24 psi, in the preferred embodiment of the invention yields extraordinary cleaning of both fibers and plastic contaminants from the object being cleaned. This expected high cleaning efficiency was not possible at any specific setting with the prior art cleaning systems. The higher electric field intensity reduction at a low air curtain pressures was consistent over repeated tests, indicatin that the downward directed flow of filtered air is an efficient transport mechanism of ions to the camera part object surface. As the air curtain pressure increases, turbulence between the air from the air curtain and that from the downward flow disrupts both the cleaning and electric field intensity removal efficiency. As the air curtain pressure increases, it overcomes this turbulence, and both efficiencies increase.

EXAMPLE 2

This example demonstrates that consistent cleaning efficiency, not possible in conventional cleaners, is provided by the positive pressurization requirement in apparatus 10 of the invention.

Referring to Table 2, in order to determine if the pressurization system was even needed, the test was repeated with the fan shut off. While no air was forced through the filter and screen, the downward direction resulting from the combination of the air knife pressures and the exhaust slots drew air though the fan and filter into the chamber:

TABLE II

| top fan off air curtain psi | E-field before kv/cm. | E-field after kv/cm. | fiber removal | plastic removal |
|---|---|---|---|---|
| 8 | 2.04 | 0.18 | 1 | 1 |
| 8 | 2.96 | 0.19 | 2 | 1 |
| 8 | 2.03 | 0.15 | 1 | 1 |
| 12 | 2.43 | 0.16 | 3 | 1 |
| 12 | 2.32 | 0.12 | 4 | 1 |
| 12 | 2.17 | 0.12 | 3 | 2 |
| 15 | 3.32 | 0.13 | 4 | 3 |
| 15 | 1.88 | 0.07 | 4 | 2 |

TABLE II-continued

| top fan off air curtain psi | E-field before kv/cm. | E-field after kv/cm. | fiber removal | plastic removal |
|---|---|---|---|---|
| 15 | 2.85 | 0.13 | 4 | 3 |
| 20 | 2.26 | 0.05 | 4 | 4 |
| 20 | 1.85 | 0.05 | 5 | 4 |
| 20 | 2.07 | 0.04 | 4 | 3 |
| 24 | 2.15 | 0.04 | 4 | 4 |
| 24 | 2.02 | 0.03 | 3 | 3 |
| 24 | 2.51 | 0.06 | 2 | 3 |
| 28 | 2.54 | 0.02 | 5 | 4 |
| 28 | 2.32 | 0.07 | 5 | 4 |
| 28 | 2.78 | 0.04 | 4 | 5 |

According to Table II, the results indicate that without the pressuration (see Table I), the cleaning efficiency is erratic, particularly at air knife pressures above about 20 psi. The reduction in electric field intensity was somewhat greater in this case than with the downwardly directed flow (table I) of filtered air on, but the cleaning efficiency was lower, and not consistent.

EXAMPLE 3

In this example it is demonstrated that cleaning efficiency of apparatus 10 can be easily optimized as a function of enclosure pressure.

Referring to Table III, tests were performed to determine the optimum cleaning efficiency with varying chamber pressures. To change the amount of air directed downwardly into the cleaning chamber or partial enclosure 12, two perforated plates were selected that restrict the air flow more than the initial perforated plate. The original perforated plate allowed greater than 50% of the filtered air to pass through into the chamber.

According to Table III, the first perforated plate to be tested restricts the air flow to 26% of the fan capacity:

TABLE III

| airknife pressure | E-field before kv/cm. | E-field after kv/cm. | rank fibers | rank plastic |
|---|---|---|---|---|
| 12 cleaned emitter points | 2.56 | 1.28 | 1 | 1 |
| 12 | 2.63 | 0.26 | 3 | 1 |
| 15 | 2.58 | 0.38 | 5 | 3 |
| 15 | 2.18 | 0.32 | 3 | 1 |
| 15 | 2.36 | 0.38 | 3 | 3 |
| 20 | 3.17 | 0.26 | 3 | 3 |
| 25 | 2.1 | 0.24 | 3 | 2 |
| 25 | 2.57 | 0.28 | 4 | 4 |
| 30 | 1.99 | 0.28 | 5 | 5 |

According to Table IV below, a second perforated plate tested restricted the air flow to 20% of fan capacity. Air direction and velocity measurements taken at the ends of the cleaning chamber or partial enclosure reveal that the cleaning chamber was positively pressurized relative to the surrounding room air.

TABLE IV

| airknife pressure | E-field before kv/cm. | E-field after kv/cm. | rank fibers | rank plastic |
|---|---|---|---|---|
| 12 | 2.06 | 0.36 | 3 | 2 |
| 15 | 3.04 | 0.56 | 4 | 1 |
| 20 | 3.18 | 0.33 | 5 | 3 |
| 20 | 2.73 | 0.32 | 4 | 3 |
| 25 | 2.66 | 0.14 | 5 | 4 |
| 25 | 2.32 | 0.09 | 5 | 4 |

As depicted in Table IV, these results indicate the importance of the pressurization requirement in enclosure 12. Comparing the electric field intensity reduction indicates that increasing the air knife pressure results in a more efficient delivery of ions to the object surface. Any higher air flow causes the pressure in the cleaning chamber to be too high, resulting in particles and fibers exiting the cleaning chamber, re-contaminating the production environment and possibly even the camera body objects.

The invention has been described with reference to a preferred embodiment. However, it will be appreciated that variations and modifications can be effected by a person of ordinary skill in the art without departing from the scope of the invention.

PARTS LIST:

| | |
|---|---|
| 1 | object to be cleaned |
| 2 | generally irregular, undulating surface features of object 1 |
| 10 | apparatus |
| 12 | partial enclosure |
| 14, 16 | opposing side walls |
| 18 | top wall |
| 20, 22 | first and second openings |
| 24 | support member |
| 26 | base block |
| 28, 30 | first and second ionizing elements |
| 32, 34 | first and second ion emitters |
| 36, 38 | first and second air knives |
| 40, 42 | exhaust ports |
| 43, 45 | exhaust slots |
| 44 | fan |
| 46 | filter assembly |
| 48, 50 | exhaust chambers |
| 52 | perforated metal baffle |
| 54 | blower |
| 56 | perforated metal baffle |

What is claimed is:

1. Apparatus for cleaning electrostatically charged particles from objects having generally irregular, undulating surface features, said apparatus comprising:

a partial enclosure having opposing side walls, a top wall joining said opposing side walls, a first opening at one end of said opposing side walls and a second opening opposite said first opening;

an object support member for supporting objects being cleaned with the generally irregular, undulating surface features exposed for cleaning inside said partial enclosure;

a first air ionizing element arranged in said partial enclosure at a predetermined angle relative to said generally irregular, undulating surface features, said first air ionizing element directing a curtain-like stream of ionized air onto the generally irregular, undulating surface features of said objects being cleaned thereby neutralizing electric field intensities and dislodging charged particles from one portion of said generally irregular, undulating surface features;

a second air ionizing element arranged in said partial enclosure opposite said first air ionizing element, said second air ionizing element being arranged at a predetermined angle relative to said generally irregular, undulating surface features, said second air ionizing element directing a curtain-like stream of ionized air onto the generally irregular, undulating surface features of said objects being cleaned thereby neutralizing electric field intensities and dislodging charged particles from a remaining portion of said generally irregular, undulating surface features; and, means for exhausting particles dislodged from said generally irregular, undulating, surface features, said particles being captured by a downward flow of directed air and directed away from said objects being cleaned.

2. The apparatus recited in claim 1 wherein said object support member comprises a generally plane surface for supporting a plurality of said objects being cleaned and transporting said plurality of objects being cleaned along a path between said first opening and said second opening of said partial enclosure.

3. The apparatus recited in claim 1 wherein said first air ionizing element is positioned proximate to said first opening, and said second air ionizing element is positioned proximate to said second opening.

4. The apparatus recited in claim 1 further comprising a means for introducing a downward directed flow of air inside said partial enclosure, said downward directed flow of air producing positive pressure inside said partial enclosure between said first opening and said second opening.

5. The apparatus recited in claim 4 wherein said means for introducing a downward directed flow of air comprises:

a source of air for providing said downward directed flow of air;

at least one filter in fluid communication with said downward directed flow of air; and, a perforated plenum arranged between said partial enclosure and said at least one filter for uniformly distributing said downward directed flow of air.

6. The apparatus recited in claim 4 wherein said means for exhausting comprises an exhaust slot positioned on each one of said opposing side walls generally below said objects being cleaned, said exhaust slot being arranged in fluid communication with a negative air pressure provided by an exhaust fan.

7. The apparatus recited in claim 6 wherein said first and second air ionizing elements, said means for introducing a downward directed flow of air and said means for exhausting are each symmetrically arranged about a centerline passing through said first opening and said second opening of said partial enclosure.

8. The apparatus recited in claim 1, wherein said first air ionizing element comprises:

a first ion emitter for generating a first cloud of ions; and, a first means for introducing a first curtain-like stream of air, said first curtain-like stream of air being in fluid communication with said first ion emitter, and said first curtain-like stream of air entraining said first cloud of ions.

9. The apparatus recited in claim 8 wherein said first means for introducing a first curtain-like stream of air delivers a pressure of at least 20 psi at said predetermined angle.

10. The apparatus recited in claim 1 wherein said second air ionizing element comprises:

a second ion emitter for generating a second cloud of ions;

a second means for introducing a second curtain-like stream of air, said second curtain-like stream of air being in fluid communication with said second ion emitter, and said second curtain-like stream of air entraining said second cloud of ions.

11. The apparatus recited in claim 10, wherein said second means for introducing a second curtain-like stream of air delivers a pressure of at least 20 psi at said predetermined angle.

12. Apparatus for cleaning objects having generally irregular, undulating surface features, said apparatus comprising:

a partial enclosure having opposing side walls, a top wall joining said opposing side walls, a first opening at one end of said side walls and a second opening opposite said first opening;

an object support member comprising a surface for supporting a plurality of said objects with said generally irregular, undulating features exposed for cleaning and transporting said plurality of objects along a path between said first opening and said second opening of said partial enclosure;

an air ionizing element movable from a first position proximate to said first opening, to a second position proximate to said second opening, said air ionizing element being arranged in said partial enclosure symmetrically about said generally irregular, undulating surface features, said air ionizing element directing a curtain-like steam of ionized air onto said generally irregular, undulating surface features of said objects thereby neutralizing electric field intensities and dislodging particles from said generally irregular, undulating surface features; and, means for exhausting particles dislodged from said generally irregular, undulating surface features, said particles being captured in a downward flow of directed air and directed away from said objects.

13. The apparatus recited in claim 12 further comprising a means for introducing a downward directed flow of air inside said partial enclosure, said downward directed flow of air producing positive pressure inside said partial enclosure between said first opening and said second opening.

14. The apparatus recited in claim 13 wherein said means for introducing a downward directed flow of air comprises:

a source of air for providing said downward directed flow of air;

at least one filter in fluid communication with said downward directed flow of air; and, a perforated plenum arranged between the enclosure and said at least one filter for uniformly distributing said downward directed flow of air.

15. The apparatus recited in claim 12, wherein said air ionizing element comprises an air knife cooperatively associated with an air ionizing bar.

16. The apparatus recited in claim 12 wherein said top wall comprises a filter chamber arranged at least partially in a path in fluid communications with said downward flow of directed air; and, wherein a pair of filter panels are arranged in said top wall between said source of said curtain-like stream of ionized air and said filter chamber.

17. The apparatus recited in claim 16 wherein a perforated metallic plate is positioned between said filter chamber and said partial enclosure for regulating the volume of exhausted air.

18. A method of cleaning electrostatically bound particles from objects having generally irregular, undulating surface features, said method comprising the steps of:

providing a cleaning apparatus comprising a partially enclosed enclosure; a source of filtered directed air; and a pair of ionizing members positioned on opposite walls of said partially enclosed enclosure;

providing an object support member for supporting said objects for cleaning in said cleaning apparatus;

arranging said objects on said object support member with said generally irregular, undulating surface features exposed for cleaning;

positioning said objects on said object support member for exposure inside said at least partially enclosed enclosure;

directing a curtain-like stream of air across said generally irregular, undulating surface features of said objects;

ionizing said generally irregular, undulating surface features of said objects for a predetermined period of time, said step of ionizing comprising neutralizing ions to eliminate static charges and related electric field intensities on a first portion of said generally irregular, undulating surface features and neutralizing static charges on a remaining portion of said generally irregular, undulating surface features so as to dislodge particles electrostatically attracted to said first portion and said remaining portion, respectively, of said generally irregular, undulating, surface features;

continually exhausting said partially enclosed enclosure so as to eliminate particles dislodged from said generally irregular, undulating surface features; and, removing said objects from said at least partially enclosed enclosure.

19. The method recited in claim 18 wherein said step of ionizing said generally irregular, undulating surface features comprises the step of applying a voltage to each of said ionizing members of about 7000 volts.

20. The method recited in claim 18 wherein said step of directing a curtain-like stream of air comprises the step of filtering said air prior to the step of directing.

* * * * *